United States Patent
Napierala

(10) Patent No.: US 7,626,995 B2
(45) Date of Patent: Dec. 1, 2009

(54) METHOD AND APPARATUS FOR SCALABLE VIRTUAL PRIVATE NETWORK MULTICASTING

(75) Inventor: Maria H. Napierala, Ocean, NJ (US)

(73) Assignee: AT&T Corp., New York, NY (US)

( * ) Notice: Subject to any disclaimer, the term of this patent is extended or adjusted under 35 U.S.C. 154(b) by 504 days.

(21) Appl. No.: 11/017,987

(22) Filed: Dec. 21, 2004

(65) Prior Publication Data

US 2006/0133375 A1 Jun. 22, 2006

(51) Int. Cl.
*H04J 3/26* (2006.01)
(52) U.S. Cl. .................. 370/432; 370/400; 370/390
(58) Field of Classification Search ............. 370/390, 370/432, 400
See application file for complete search history.

(56) References Cited

U.S. PATENT DOCUMENTS

| | | | | |
|---|---|---|---|---|
| 6,021,120 | A * | 2/2000 | Beyda et al. | 370/282 |
| 6,724,722 | B1 * | 4/2004 | Wang et al. | 370/229 |
| 2006/0088031 | A1 * | 4/2006 | Nalawade | 370/390 |

OTHER PUBLICATIONS

Aggarwal, R. et al. ("Multicast in BGP/MPLS VPNs and VPLs", Internet Engineering Task Force, Oct. 2004).*
"Multicast-VPN-IP Multicast Support for MPLS VPNs", Cisco IOS Release 12.2(13)T, 2002.*
Aggarwal, R., et al., "Multicast in BGP/MPLS VPNs and VPLs", Internet Engineering Task Force, Oct. 2004.*
EP Search Report for EP 05 11 2650, Dated Mar. 15, 2006, 2 pages, received by European associate on Mar. 28, 2006.
Aggarwal, R., et al: "Multicast in BGP/MPLS VPNs and VPLs", Internet Engineering Task Force, Oct. 2004.
Jun-Hong Cui, et al.: "Scalable QoS multicast provisioning in diff-serv-supported MPLS networks", Globecom 2002—IEEE Global Telecommunications Conference, Nov. 17-21, 2002.
Fei A., et al: "Aggregated Multicast: An Approach To Reduce Multicast State", Globecom '01, 2001 IEEE Global Telecommunications Conference, Nov. 25-29, 2001.
Apostolopoulos, G. Ed—Institute of Electrical and Electronics Engineers: "Routing alternatives for virtual private networks", ICC 2003, 2003 IEEE International Conference on Communications, May 11-15, 2003.
Cui J-H, et al.: Aggregated Multicast: A Scheme to Reduce Multicast States <draft-cui-multicast-aggregation-01.txt> Internet Engineering Task Force, Sep. 2002.

* cited by examiner

*Primary Examiner*—Jason E Mattis
*Assistant Examiner*—Kibrom T Hailu

(57) ABSTRACT

In one embodiment, the present invention is a method and apparatus for scalable virtual private network multicasting. In one embodiment a service network builds a new data multicast distribution tree for each high-bandwidth multicast data flow (e.g., multicast data flows that require an amount bandwidth meeting or exceeding a predefined threshold). However, if the multicast data flow is a low-bandwidth flow (e.g., if the required amount of bandwidth falls below the predefined threshold), the multicast data flow is routed over an existing multicast distribution tree in order to minimize an amount of state information that must be maintained by service provider core routers in the backbone network.

15 Claims, 3 Drawing Sheets

METHOD AND APPARATUS FOR SCALABLE VIRTUAL PRIVATE NETWORK MULTICASTING

FIELD OF THE INVENTION

The present invention relates generally to service networks, and relates more particularly to the scaling of multicast virtual private networks.

BACKGROUND OF THE INVENTION

FIG. 1 is a schematic diagram illustrating an exemplary service network 100. The service network 100 comprises a multiprotocol label switching (MPLS) service provider backbone network 112 supporting a plurality of individual private network sites $102_1$-$102_n$ (hereinafter collectively referred to as "sites 102"). A subset of these sites 102 forms a virtual private network (VPN). The backbone network 112 comprises a plurality of provider edge (PE) routers $106_1$-$106_n$ (hereinafter collectively referred to as "PE routers 106") and a plurality of provider core routers $108_1$-$108_n$ (hereinafter collectively referred to as "P routers 108") for receiving and forwarding data (e.g., received from sites 102). Each of the sites 102 comprises at least one customer edge router $104_1$-$104_n$ (hereinafter collectively referred to as CE routers 104") that connects the site 102 to the backbone network 112. If at least two of the sites 102 are multicast-enabled, they make up a "multicast domain".

Each multicast domain has a default multicast distribution tree (MDT) through the backbone network 112 that defines the path used by PE routers 106 to send multicast data and control messages to every other PE router 106 connected to the multicast domain. In some cases, this default MDT may not be the most optimal means of forwarding data. For example, consider a multicast domain comprising sites $102_1$, $102_2$ and $102_3$. If a default MDT were used to send data to a subset of sites 102 in the multicast domain (e.g., from a sender in site $102_1$ to a receiver in site $102_3$), the data would also be forwarded to destinations in the multicast domain that are dead ends, i.e., not on the path to the intended receiver (e.g., PE router $106_2$). This is wasteful, especially for high-bandwidth multicast traffic, and makes the service network 100 very difficult to scale.

One solution to the bandwidth conservation problem is the implementation of individual MDTs for specific multicast groups, referred to as "data MDTs". A data MDT (e.g., data MDT 110, illustrated as a dashed line) delivers VPN data traffic for a particular multicast group (e.g., comprising sites $102_1$ and $102_3$) only to those PE routers 106 that are on the path to receivers of the multicast group. This reduces the amount of multicast traffic on the backbone network 112 and reduces load on some PE routers 106. However, it also increases an amount of VPN-specific state knowledge (e.g., routing information) that must be maintained by the P routers 108, as a separate MDT must be maintained for each multicast source or multicast group. Therefore, the problem of scalability remains.

Thus, there is a need in the art for a method and apparatus for scalable virtual private network multicasting.

SUMMARY OF THE INVENTION

In one embodiment, the present invention is a method and apparatus for scalable virtual private network multicasting. In one embodiment a service network builds a new data multicast distribution tree for each high-bandwidth multicast data flow (e.g., multicast data flows that require an amount bandwidth meeting or exceeding a predefined threshold). However, if the multicast data flow is a low-bandwidth flow (e.g., if the required amount of bandwidth falls below the predefined threshold), the multicast data flow is routed over an existing multicast distribution tree in order to minimize an amount of state information that must be maintained by service provider core routers in the backbone network.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one embodiment, the present invention relates to the scaling of multicast virtual private networks (MVPNs). In one embodiment, a data MDT is created only for data transmissions requiring an amount of bandwidth that exceeds a predefined cumulative threshold. An aggregated data transmission that requires an amount of bandwidth falling below the predefined threshold may be sent over an existing MDT, substantially eliminating the need to create a discrete MDT for every data flow and reducing the amount of state information that must be maintained by service provider routers. An MVPN implementing such a scheme is therefore substantially more scalable than existing MVPNs.

Moreover, the re-use of existing MDTs as described above facilitates bandwidth optimization for MVPNs by maintaining the efficiency of bandwidth usage on P and PE routers. As will be discussed in greater detail below, exhausted data MDTs may be re-used based on a best match to the optimal tree for a given flow of multicast traffic. In some embodiments, a new data MDT is not even created for a given flow of multicast traffic until it can be determined whether an existing data MDT is optimal for the given flow.

Figure 1:
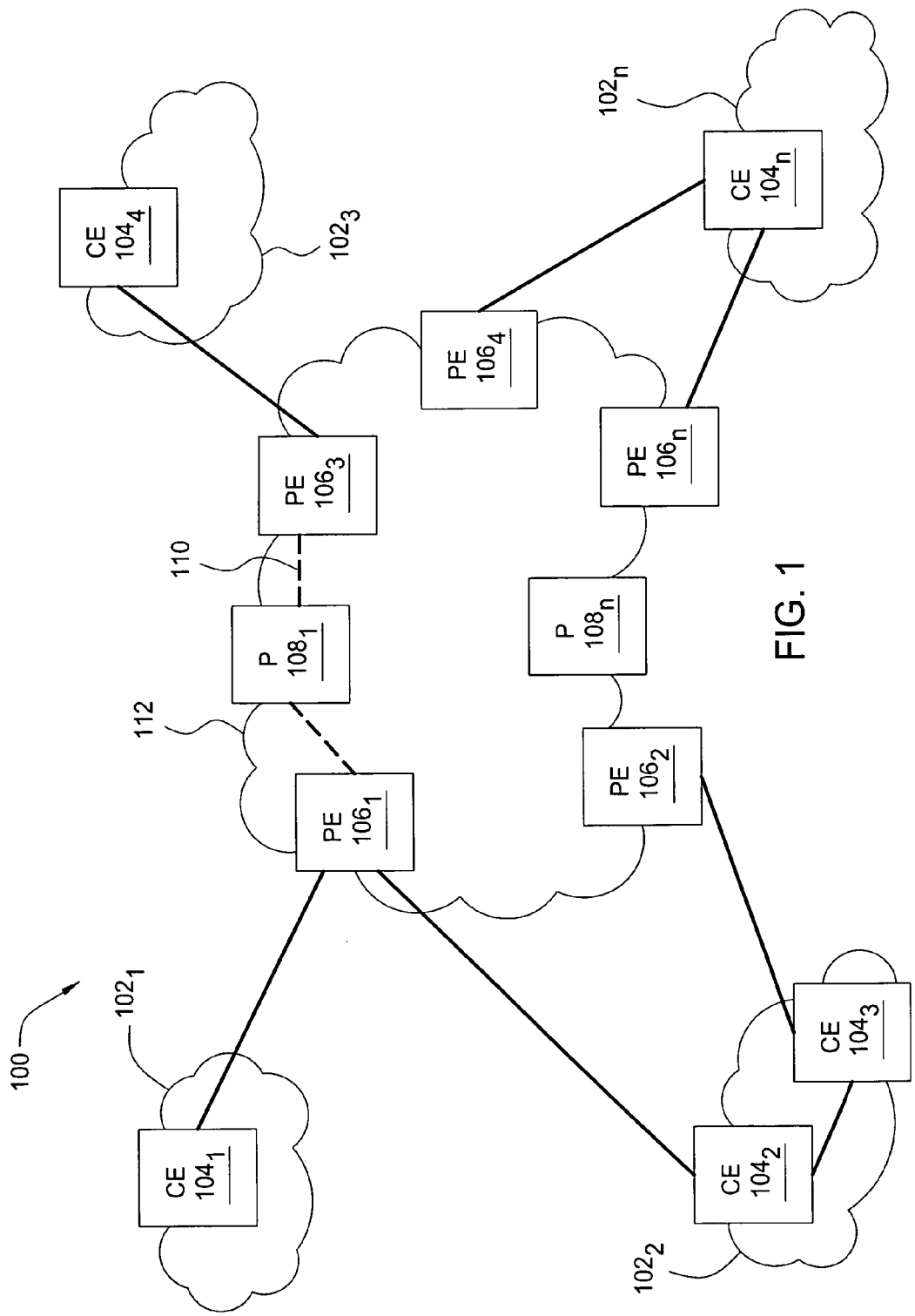
FIG. 1 is a schematic diagram illustrating an exemplary service network.
Figure 2:
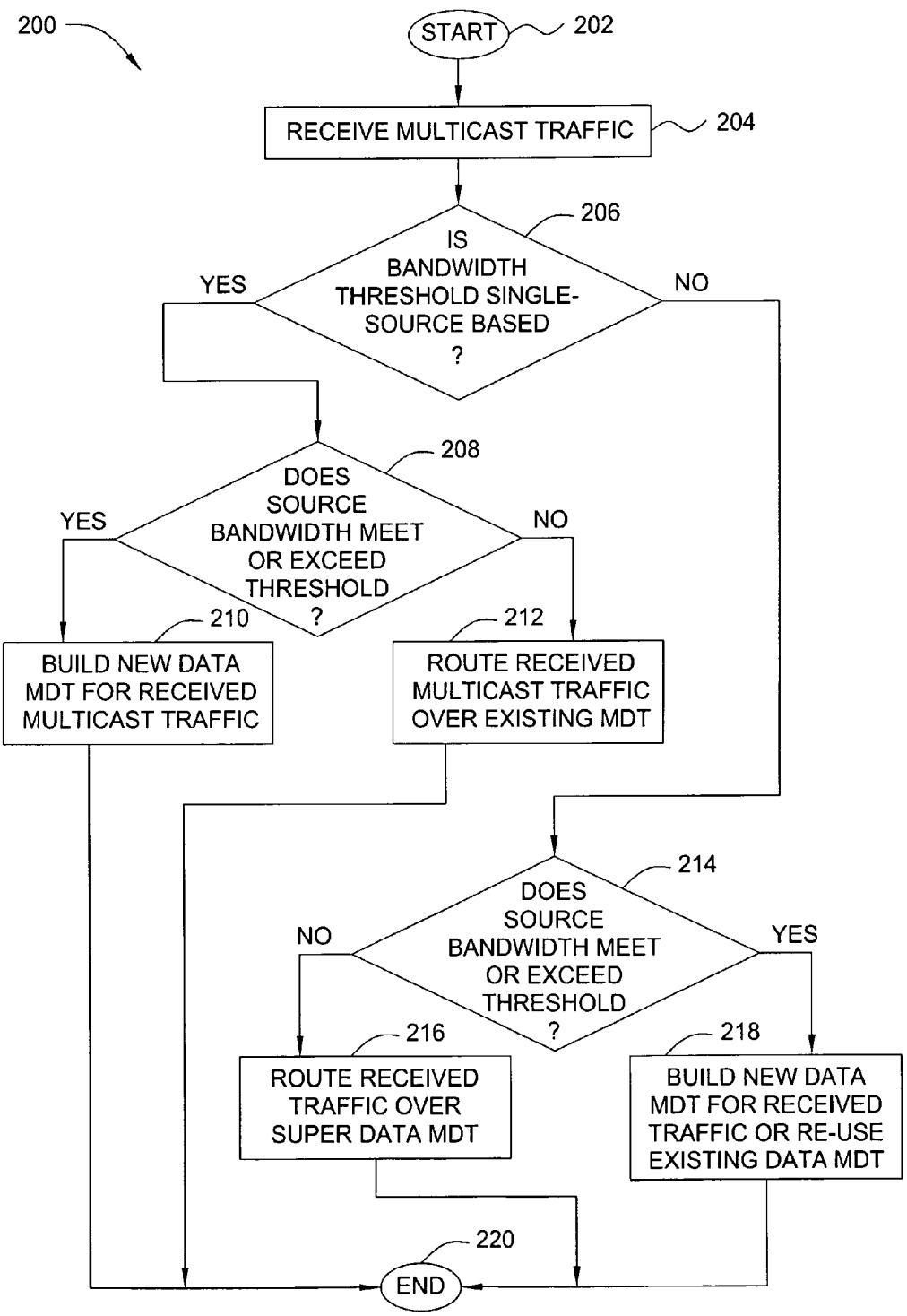
FIG. 2 is a flow diagram illustrating one embodiment of a method for sending MVPN traffic over a service provider backbone network (e.g., an MPLS network)

FIG. 2 is a flow diagram illustrating one embodiment of a method 200 for sending MVPN traffic over a service provider backbone network (e.g., an MPLS network). The method 200 may be executed at, for example, a PE router 106 that is connected to a multicast domain comprising two or more customer sites 102. For the purposes of discussion, assume that the method 200 executes at PE router $106_1$ of FIG. 1. The method 200 is initialized at step 202 and proceeds to step 204, where the method 200 receives multicast traffic from a source in a first customer site (e.g., site $102_1$). The multicast traffic is intended for at least one receiver in at least a second site 102 connected to the backbone network 112. For example, the method 200 may receive multicast traffic from a source in site $102_1$ that is intended for a first receiver in site $102_2$ and second a third receivers in site $102_3$.

In step 206, the method 200 determines whether a predefined source bandwidth threshold for an MDT in the service network 100 is single-source based (e.g., such that the threshold applies to the source bandwidth for a single multicast traffic flow) or cumulative-source based (e.g., such that the threshold applies to a sum of source bandwidths for a plurality of multicast traffic flows flowing over a single MDT at one time). In one embodiment, the type and value of the threshold is user-definable and depends on an acceptable degree of extraneousness and/or a desired level of scalability for a particular network or application, as described in further detail below.

If the method 200 determines in step 206 that the threshold is single-source based, the method 200 proceeds to step 208 and determines whether the source bandwidth meets or exceeds the predefined threshold. If the source bandwidth does meet or exceed the predefined threshold, the method 200 proceeds to step 210 and builds a new data MDT for the received traffic, e.g., in accordance with known methods for building data MDTs.

Alternatively, if the method 200 determines in step 208 that the source bandwidth does not meet or exceed the predefined threshold, the method 200 proceeds to step 212 and routes the received multicast traffic over an existing data MDT. In one embodiment, the step 210 of routing the received multicast traffic over an existing data MDT includes identifying an existing data MDT that best matches an optimal distribution tree for the received multicast traffic. In one embodiment, the best-matching existing data MDT services every intended receiver of the received multicast traffic (e.g., by servicing the associated PE routers 106) and also services the least number of extraneous or uninterested receivers. In one embodiment, such a method is implemented where no more data MDTs can be built (e.g., the multicast addresses assigned to the data MDTs have been exhausted).

Referring back to step 206, if the method 200 determines that the bandwidth threshold is not single-source based (e.g., is cumulative-source based), the method 200 proceeds to step 214 and determines whether the source bandwidth meets or exceeds the cumulative-source based threshold. If the threshold has not yet been met, the method 200 proceeds to step 216 and routes the received traffic over an active new type of MDT, hereinafter referred to as a "super data MDT". A super data MDT is an MDT that has a root at the receiving PE router (e.g., the PE router $106_1$ at which the method 200 is executing and which directly services the source of the received multicast traffic) and spans all other PE routers 106 in the MPLS VPN that service interested receivers for at least one flow of multicast traffic (including the received multicast traffic) having a source serviced by the root PE router $106_1$.

Alternatively, if the method 200 determines in step 214 that the source bandwidth does meet or exceed the cumulative-source based threshold, the method 200 proceeds to step 218 and either builds a new data MDT for the received traffic (e.g., in accordance with known methods for building data MDTs) or re-uses an existing data MDT for routing the received traffic (e.g., in a manner substantially similar to step 212). If the method 200 builds a new data MDT, this new data MDT will span all PE routers 106 that service interested receivers for the received multicast traffic. The method 200 then terminates in step 220.

A super data MDT will be active for as long as there is at least one multicast flow currently being received by the root PE router (e.g., PE router $106_1$) and at least one interested receiver for the received multicast flow. Moreover, if a given PE router 106 does not service any interested receivers for any multicast data flow sourced at the root PE router, traffic from the root PE router is not sent to the given PE router.

It will be apparent that in some cases, the routing of multicast traffic over an existing data MDT (e.g., in accordance with steps 212 or 218) will result in multicast traffic being sent to PE routers that do not service any interested receivers for a particular flow of multicast traffic. Thus, the predefined threshold that is assessed in steps 208 and 214 should define a threshold below which the required bandwidth is acceptably low for such extraneousness (e.g., the required bandwidth is low enough that the multicast traffic may be dropped by an extraneous, uninterested PE router with minimal concern or consequence). As discussed above, this level of acceptable extraneousness may depend on the particular application or on desired network performance or scalability (e.g., as defined by a service level agreement).

In this way, the amount of state information that must be maintained by the network's P routers 108 is minimized. Specifically, the amount of state information maintained by the P routers 108 according to the method 200 remains more proportional to the number of VPNs on the network 100, rather than proportional to a number of individual multicast groups or multicast traffic sources. This creates less churn in the backbone network 112, thereby substantially stabilizing the backbone network 112. Moreover, the reduced amount of state information that is maintained in the P routers 108 allows the service network 100 to be scaled more easily than a traditional MPLS VPN system.

Further, in one embodiment, the method 200 is implemented only to carry multicast traffic, and all control traffic is transported along the default MDT, thereby further stabilizing the default MDT.

Figure 3:
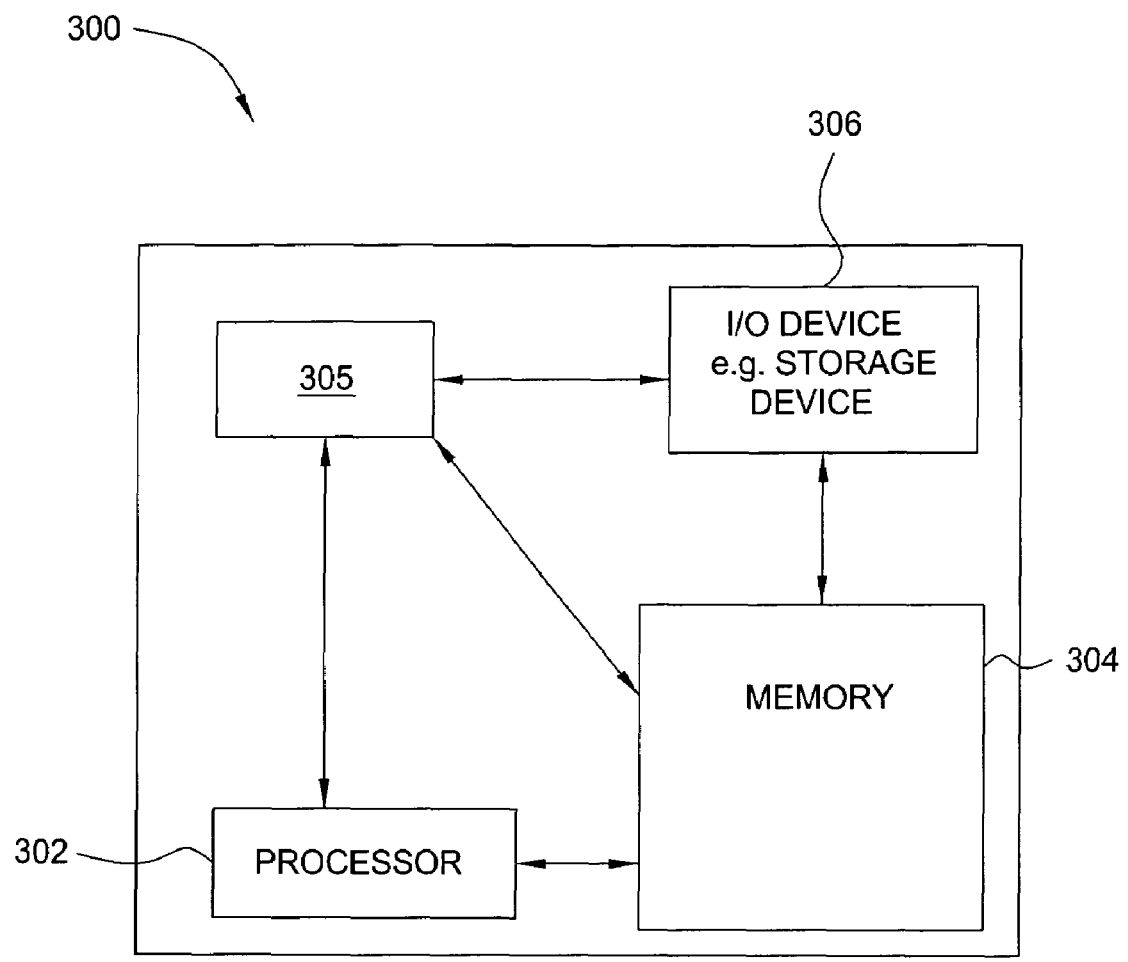
FIG. 3 is a high level block diagram of the present VPN multicasting system that is implemented using a general purpose computing device.

FIG. 3 is a high level block diagram of the present VPN multicasting system that is implemented using a general purpose computing device 300. In one embodiment, a general purpose computing device 300 comprises a processor 302, a memory 304, a VPN multicasting module 305 and various input/output (I/O) devices 306 such as a display, a keyboard, a mouse, a modem, and the like. In one embodiment, at least one I/O device is a storage device (e.g., a disk drive, an optical disk drive, a floppy disk drive). It should be understood that the VPN multicasting module 305 can be implemented as a physical device or subsystem that is coupled to a processor through a communication channel.

Alternatively, the VPN multicasting module 305 can be represented by one or more software applications (or even a combination of software and hardware, e.g., using Application Specific Integrated Circuits (ASIC)), where the software is loaded from a storage medium (e.g., I/O devices 306) and operated by the processor 302 in the memory 304 of the general purpose computing device 300. Thus, in one embodiment, the VPN multicasting module 305 for scalably multicasting over VPN systems described herein with reference to the preceding Figures can be stored on a computer readable medium or carrier (e.g., RAM, magnetic or optical drive or diskette, and the like).

Thus, the present invention represents a significant advancement in the fields of service networks and VPN multicasting. A method is disclosed that not only optimizes bandwidth consumption in MVPN systems, but also enables such systems to be scaled in a feasible and stable manner.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for sending multicast data from a source to at least one receiver, the method comprising:

providing at least one existing multicast distribution tree;

determining whether a predefined threshold for said at least one existing multicast distribution tree is single-source based or is cumulative-source based;

if said predefined threshold is single-source based, building a new data multicast distribution tree for sending said multicast data to said at least one receiver if an amount of bandwidth required to send said multicast data meets or exceeds said predefined threshold, wherein said new data multicast distribution tree defines one or more paths for delivering multicast data to a plurality of receivers in a multicast group;

sending said multicast data to said at least one receiver over an existing multicast distribution tree of said at least one existing multicast distribution tree if said amount of bandwidth required to send said multicast data falls below said predefined threshold, wherein said building and sending are implemented to carry multicast traffic only, and control traffic is carried along a default multicast distribution tree;

if said predefined threshold is cumulative-source based, building a new super data multicast distribution tree for sending said multicast data to said at least one receiver if an amount of bandwidth required to send said multicast data meets or exceeds said predefined threshold, wherein said new super data multicast distribution tree defines one or more paths for delivering multicast data to a plurality of receivers in a multicast group; and sending said multicast data to said at least one receiver over an existing super multicast distribution tree if said amount of bandwidth required to send said multicast data falls below said predefined threshold.

2. The method of claim 1, wherein said predefined threshold that is cumulative-source based is cumulative such that a sum of source bandwidths for a plurality of multicast data flows sent over a single existing multicast distribution tree falls below said predefined threshold.

3. The method of claim 1, wherein said predefined threshold is defined based on at least one of: an acceptable degree of extraneousness and a desired level of service.

4. The method of claim 1, wherein said existing multicast distribution tree serves at least said at least one provider edge router servicing at least one interested receiver.

5. The method of claim 1, wherein said source resides on a first virtual private network site, and said at least one intended receiver resides on at least a second virtual private network site, said first virtual private network site and said second virtual private network site being connected to a common service provider backbone network.

6. The method of claim 5, wherein said service provider backbone network is a multiprotocol label switching network.

7. The method of claim 1, wherein said super data multicast distribution tree is a multicast distribution tree having a root at a provider edge router servicing said source and spanning all other provider edge routers that service interested receivers for said multicast data, including said at least one receiver.

8. A computer readable medium containing an executable program for sending multicast data from a source to at least one receiver, where the program performs steps of:

providing at least one existing multicast distribution tree;

determining whether a predefined threshold for said at least one existing multicast distribution tree is single-source based or is cumulative-source based;

if said predefined threshold is single-source based, building a new data multicast distribution tree for sending said multicast data to said at least one receiver if an amount of bandwidth required to send said multicast data meets or exceeds said predefined threshold, wherein said new data multicast distribution tree defines one or more paths for delivering multicast data to a plurality of receivers in a multicast group; and sending said multicast data to said at least one receiver over an existing multicast distribution tree of said at least one existing multicast distribution tree if said amount of bandwidth required to send said multicast data falls below said predefined threshold, wherein said building and sending steps are implemented to carry multicast traffic only, and control traffic is carried along a default multicast distribution tree;

if said predefined threshold is cumulative-source based, building a new super data multicast distribution tree for sending said multicast data to said at least one receiver if an amount of bandwidth required to send said multicast data meets or exceeds said predefined threshold, wherein said new super data multicast distribution tree defines one or more paths for delivering multicast data to a plurality of receivers in a multicast group; and sending said multicast data to said at least one receiver over an existing super multicast distribution tree if said amount of bandwidth required to send said multicast data falls below said predefined threshold.

9. The computer readable medium of claim 8, wherein said predefined threshold that is cumulative-source based is cumulative such that a sum of source bandwidths for a plurality of multicast data flows sent over a single existing multicast distribution tree falls below said predefined threshold.

10. The computer readable medium of claim 8, wherein said predefined threshold is defined based on at least one of: an acceptable degree of extraneousness and a desired level of service.

11. The computer readable medium of claim 8, wherein said existing multicast distribution tree serves at least said at least one provider edge router servicing at least one interested receiver.

12. The computer readable medium of claim 8, wherein said source resides on a first virtual private network site, and said at least one intended receiver resides on at least a second virtual private network site, said first virtual private network site and said second virtual private network site being connected to a common service provider backbone network.

13. The computer readable medium of claim 12, wherein said service provider backbone network is a multiprotocol label switching network.

14. The computer readable medium of claim 8, wherein said super data multicast distribution tree is a multicast distribution tree having a root at a provider edge router servicing said source and spanning all other provider edge routers that service interested receivers for said multicast data, including said at least one receiver.

15. Apparatus for sending multicast data from a source to at least one receiver, the apparatus comprising:

means for providing at least one existing multicast distribution tree;

means for determining whether a predefined threshold for said at least one existing multicast distribution tree is single-source based or is cumulative-source based;

if said predefined threshold is single-source based, means for building a new data multicast distribution tree for sending said multicast data to said at least one receiver if an amount of bandwidth required to send said multicast data meets or exceeds said predefined threshold, wherein said new data multicast distribution tree defines one or more paths for delivering multicast data to a plurality of receivers in a multicast group;

means for sending said multicast data to said at least one receiver over an existing multicast distribution tree of said at least one existing multicast distribution tree if said amount of bandwidth required to send said multicast data falls below said predefined threshold, wherein said building and sending steps are implemented to carry multicast traffic only, and control traffic is carried along a default multicast distribution tree;

if said predefined source bandwidth threshold is cumulative-source based, means for building a new super data multicast distribution tree for sending said multicast data to said at least one receiver if an amount of bandwidth required to send said multicast data meets or exceeds said predefined threshold, wherein said new super data multicast distribution tree defines one or more paths for delivering multicast data to a plurality of receivers in a multicast group; and means for sending said multicast data to said at least one receiver over an existing super multicast distribution tree if said amount of bandwidth required to send said multicast data falls below said predefined threshold.

* * * * *